US012745872B2

(12) United States Patent
Groll et al.

(10) Patent No.: US 12,745,872 B2
(45) Date of Patent: Sep. 29, 2026

(54) COOKWARE WITH COPPER BONDED LAYER

(71) Applicant: All-Clad Metalcrafters, L.L.C., Canonsburg, PA (US)

(72) Inventors: William A. Groll, McMurray, PA (US); Bruce W. Perry, Canonsburg, PA (US)

(73) Assignee: All-Clad Metalcrafters, L.L.C., Canonsburg, PA (US)

( * ) Notice: Subject to any disclaimer, the term of this patent is extended or adjusted under 35 U.S.C. 154(b) by 0 days.

(21) Appl. No.: 18/398,234

(22) Filed: Dec. 28, 2023

(65) Prior Publication Data

US 2024/0122391 A1 Apr. 18, 2024

Related U.S. Application Data

(60) Continuation of application No. 17/668,412, filed on Feb. 10, 2022, now Pat. No. 11,903,512, which is a division of application No. 16/021,477, filed on Jun. 28, 2018, now Pat. No. 11,344,145.

(60) Provisional application No. 62/539,104, filed on Jul. 31, 2017.

(51) Int. Cl.

| | |
|---|---|
| ***A47J 27/00*** | (2006.01) |
| ***A47J 36/02*** | (2006.01) |
| ***B23K 20/02*** | (2006.01) |
| ***H05B 6/36*** | (2006.01) |
| *B32B 7/04* | (2019.01) |
| *B32B 15/01* | (2006.01) |

(52) U.S. Cl.

CPC ............ *A47J 27/002* (2013.01); *A47J 36/02* (2013.01); *B23K 20/023* (2013.01); *H05B 6/36* (2013.01); *B32B 7/04* (2013.01); *B32B 15/015* (2013.01); *B32B 2250/42* (2013.01); *B32B 2307/302* (2013.01); *B32B 2311/12* (2013.01); *B32B 2311/30* (2013.01)

(58) Field of Classification Search

CPC A47J 27/002; A47J 36/02; B32B 7/04; B32B 15/015; B32B 2250/42; B32B 2307/302; B32B 2311/12; B32B 2311/30

USPC ........................................................ 220/573.1

See application file for complete search history.

(56) References Cited

U.S. PATENT DOCUMENTS

| | | | | |
|---|---|---|---|---|
| 4,167,606 | A | 9/1979 | Ulam | |
| 4,246,045 | A | 1/1981 | Ulam | |
| 5,470,012 | A * | 11/1995 | Linse | B23K 20/08 228/119 |
| 6,267,830 | B1 | 7/2001 | Groll | |
| 6,858,102 | B1 | 2/2005 | Kardokus et al. | |

(Continued)

*Primary Examiner* — Orlando E Aviles
*Assistant Examiner* — Niki M Eloshway
(74) *Attorney, Agent, or Firm* — The Webb Law Firm

(57) ABSTRACT

Provided is an article of cookware and a method of making the same. The cookware has at least one stainless steel layer and at least one copper layer metallurgically bonded directly to the at least one stainless steel layer via solid state bonding. The at least one stainless steel layer may be a ferritic stainless steel layer, and the at least one copper layer may be a grain stabilized copper. The at least one stainless steel layer may be made from a 400 series stainless steel, such as a 436 stainless steel alloy, a 439 stainless steel alloy, or a 444 stainless steel alloy. The at least one copper layer may be made from a high purity, oxygen free copper alloy, such as a C101 copper alloy, a C102 copper alloy, or a C107 copper alloy.

20 Claims, 4 Drawing Sheets

(56) References Cited

U.S. PATENT DOCUMENTS

| | | | | |
|---|---|---|---|---|
| 8,133,596 | B2 | 3/2012 | Groll | |
| 9,914,275 | B1 * | 3/2018 | Smith | B30B 15/064 |
| 2005/0208272 | A1 | 9/2005 | Groll | |
| 2006/0042623 | A1 | 3/2006 | Cheng et al. | |
| 2006/0283865 | A1 | 12/2006 | Cheng | |
| 2007/0000915 | A1 | 1/2007 | Cheng | |
| 2007/0068609 | A1 | 3/2007 | Saleh | |
| 2008/0014714 | A1 | 1/2008 | Bourdelle et al. | |
| 2008/0241582 | A1 | 10/2008 | Groll | |
| 2009/0309186 | A1 | 12/2009 | Inoue et al. | |
| 2010/0206612 | A1 | 8/2010 | Schiefer | |
| 2010/0242282 | A1 | 9/2010 | Huang | |
| 2012/0273483 | A1 | 11/2012 | Pimiae | |
| 2013/0112565 | A1 | 5/2013 | Filson et al. | |
| 2015/0001226 | A1 | 1/2015 | Groll | |
| 2015/0313405 | A1 | 11/2015 | Groll et al. | |
| 2015/0354023 | A1 * | 12/2015 | Ranganathan | C21D 8/0447 148/531 |
| 2016/0331174 | A1 | 11/2016 | Allemand et al. | |
| 2017/0157895 | A1 | 6/2017 | Groll et al. | |
| 2017/0245677 | A1 | 8/2017 | Cheng | |
| 2019/0194491 | A1 | 6/2019 | Shen et al. | |

* cited by examiner

COOKWARE WITH COPPER BONDED LAYER

CROSS-REFERENCE TO RELATED APPLICATIONS

This application is a continuation of U.S. application Ser. No. 17/668,412, filed Feb. 10, 2022, which is a divisional application of U.S. application Ser. No. 16/021,477, filed Jun. 28, 2018 and now issued as U.S. Pat. No. 11,344,145, which claims priority to U.S. Provisional Application Ser. No. 62/539,104, filed on Jul. 31, 2017, the disclosures of which are hereby incorporated by reference in their entirety.

BACKGROUND OF THE INVENTION

Field of the Invention

The present invention relates to multi-ply, bonded cookware having at least one copper layer bonded to at least one stainless steel layer. A method for making the bonded cookware using solid state bonding is also disclosed.

Description of Related Art

It has long been known to manufacture multi-layer bonded composite cookware in which various materials are joined together to combine the desired physical properties of each of the materials into a composite. For example, the corrosion resistance of stainless steel is ideal for the cooking surface as well as for the exterior surface of cookware; however, the thermal conductivity of stainless steel is not relatively high. On the other hand, aluminum and/or copper offer much higher thermal conductivities and have been bonded to stainless steel to provide well-known composite cookware items such as pots, pans, griddles, and the like. Multi-layer bonded cookware is known in the art, as shown in a number of patents, such as, for example: U.S. Pat. Nos. 4,246,045 and 4,167,606 to Ulam; and U.S. Pat. Nos. 8,133,596 and 6,267,830 to Groll. These patents demonstrate that the manufacture of multi-layer bonded cookware comprising stainless steel outer layers bonded to central layer(s) of a higher conductivity aluminum and/or copper is well known in the art. The bonding between layers of these different materials is commonly achieved by conventional roll-bonding techniques using strips of aluminum and/or copper, roll-bonded to outer strips of stainless steel. It is known that roll-bonding between copper, aluminum, and stainless steel layers is conventional in the art of making composite cookware and other food preparation apparatus.

A solid state bonding technique using high static pressure and heat applied over time to make a plurality of composite blanks of, for example, a combination of stainless steel—aluminum—stainless steel in the manufactured cookware, is disclosed in U.S. Pat. No. 9,078,539 to Groll et al. There is a need in the art for producing cookware made using solid state bonding techniques for reducing the weight and improving thermal characteristics of the cookware.

SUMMARY OF THE INVENTION

In view of the existing need in the art, it would be desirable to develop new methods of producing cookware using solid state bonding techniques. It would be further desirable to provide cookware made by such methods, wherein the cookware in some embodiments has reduced weight and improved thermal characteristics over existing cookware made by solid state bonding techniques.

In accordance with one embodiment or aspect of the present disclosure, cookware may have a multi-layer, solid state bonded composite wall structure. The cookware may have at least one stainless steel layer, and at least one copper layer metallurgically bonded to the at least one stainless steel layer via solid state bonding. The at least one stainless steel layer may be a ferritic stainless steel layer, and the at least one copper layer may be a grain stabilized copper.

In accordance with another embodiment or aspect of the present disclosure, the at least one stainless steel layer may be made from a 300 series stainless steel or a 400 series stainless steel. The at least one stainless steel layer may be made from a 436 stainless steel alloy, a 439 stainless steel alloy, or a 444 stainless steel alloy. The at least one stainless steel layer may be made from a ferro-magnetic stainless steel with chrome content of at least 17%. The grain stabilized copper may be selected from one of a C101 copper alloy, a C102 copper alloy, or a C107 copper alloy. The at least one stainless steel layer may have a thickness between about 0.010 inches to about 0.100 inches, more preferably 0.015 inches to about 0.025 inches. The at least one copper layer may have a thickness between about 0.010 inches to about 0.25 inches, more preferably 0.05 inches to about 0.150 inches. The at least one stainless steel layer may be circular with a diameter between about 5 inches to about 25 inches. The at least one copper layer may be circular with a diameter between about 5 inches to about 25 inches. The at least one stainless steel layer and the at least one copper layer may be circular, and wherein a diameter of the at least one stainless steel layer may be equal to or larger than a diameter of the at least one copper layer. The at least one stainless steel layer and the at least one copper layer may be circular, and wherein a center of the at least one stainless steel layer may be on a common axis with a center of the at least one copper layer. The cookware may be formed as a frying pan. Of course, other geometric shapes may be used such as square, rectangular, oval, and the like may be used if desired depending upon the final desired shape of the cookware or cook surface.

In accordance with another embodiment or aspect of the present disclosure, cookware may have a multi-layer, solid state bonded composite wall structure. The cookware may have an upper stainless steel layer and a lower stainless steel layer, and a copper layer between the upper stainless steel layer and the lower stainless steel layer. The copper layer may be metallurgically bonded to the upper stainless steel layer and the lower stainless steel layer via solid state bonding. The upper stainless steel layer and the lower stainless steel layer may be made from a ferritic stainless steel, and the copper layer may be made from a copper alloy comprising silver. A ring-shaped portion of the lower stainless steel layer may be removed around a perimeter of the cookware to visually expose a portion of the copper layer.

In accordance with a still further embodiment or aspect of the present disclosure, cookware may have a multi-layer, solid state bonded composite wall structure. The cookware may have an upper stainless steel layer defining the cook surface, a copper layer, a lower stainless steel layer, and a copper layer forming the exterior, outer surface of the cookware. Hence, a four-layer structure is provided by this embodiment.

Still further, another embodiment of the present disclosure, cookware may have a multi-layer, solid state bonded composite wall structure comprising a five-layer composite having an upper stainless steel layer defining the cook surface, a copper layer, a stainless steel layer, a copper layer, and a stainless steel layer forming the exterior outer surface of the cookware.

In accordance with another embodiment or aspect of the present disclosure, a method of making multi-layer, bonded cookware may include providing at least one stainless steel layer and at least one copper layer in a stacked blank assembly, and applying heat and pressure to the stacked blank assembly for a predetermined period of time such that at least one stainless steel layer is metallurgically bonded to the at least one copper layer via solid state bonding. The at least one stainless steel layer may be a ferritic stainless steel layer, and the at least one copper layer may be a grain stabilized copper.

In accordance with another embodiment or aspect of the method of the present disclosure, heat may be applied at a temperature below a grain growth temperature of the at least one copper layer. Heat may be applied at a temperature between about 625° C. to about 675° C. (1150° F. to 1250° F.). Pressure may be applied at about 5,000 psi to about 20,000 psi (350 kg/cm$^2$ to 1,400 kg/cm$^2$). Pressure may be applied in a direction normal to a plane of the at least one stainless steel plate and the at least one copper plate while the stacked plates are at elevated temperature so as to achieve solid state bonding between the plates. The predetermined period of time may be about 1 hour to about 3 hours. The step of applying heat and pressure may be carried out by an induction heating coil surrounding the blank assembly. A non-oxidizing atmosphere may be present between the induction heating coil and the blank assembly. The method may further include forming the bonded blank assembly into a frying pan shape using a drawing press or a hydroform machine, or the like.

These and other features and characteristics of the cookware described herein, as well as methods of making such cookware, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only.

BRIEF DESCRIPTION OF THE DRAWING(S)

In FIGS. 1-10, the same characters represent the same components unless otherwise indicated.

DETAILED DESCRIPTION OF THE INVENTION

Figure 1:
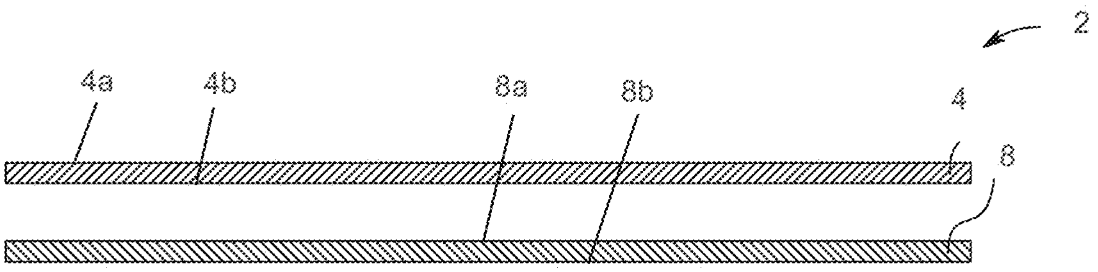
FIG. 1 is an exploded, side cross-sectional view of a blank assembly of one embodiment or aspect of the present disclosure.

As used herein, the singular form of "a", "an", and "the" includes plural referents unless the context clearly dictates otherwise.

As used herein, spatial or directional terms, such as "left", "right", "up", "down", "inner", "outer", "above", "below", and the like, relate to various features as depicted in the drawing figures. However, it is to be understood that various alternative orientations can be assumed and, accordingly, such terms are not to be considered as limiting.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

As used herein, the term "substantially parallel" means a relative angle as between two objects (if extended to theoretical intersection), such as elongated objects and including reference lines, that is from 0° to 5°, or from 0° to 3, or from 0° to 2°, or from 0° to 1°, or from 0° to 0.5°, or from 0° to 0.25°, or from 0° to 0.1°, inclusive of the recited values.

All documents, such as but not limited to issued patents and patent applications, referred to herein, and unless otherwise indicated, are to be considered to be "incorporated by reference" in their entirety.

As used herein, the term "solid state bonding" means a method of bonding two or more stacked plates of metals or metal alloys together using high static pressure (typically over 5,000 psi (350 kg/cm$^2$)) and high temperature (typically over 600° F. (315° C.), wherein the high static pressure is applied in a normal or perpendicular direction, i.e., 90° relative to the plane of the stacked plates.

As used herein, the term "metallurgical bonding" or "metallurgically bonded" refers to a bond formed between similar or dissimilar materials that is free of voids or discontinuities.

As used herein, the term "grain stabilized copper" refers to any high purity, deoxidized copper or copper alloy having some residual hardness or temper from fully annealed up to ½ hard that exhibits controlled grain growth properties during solid state bonding.

Figure 2:
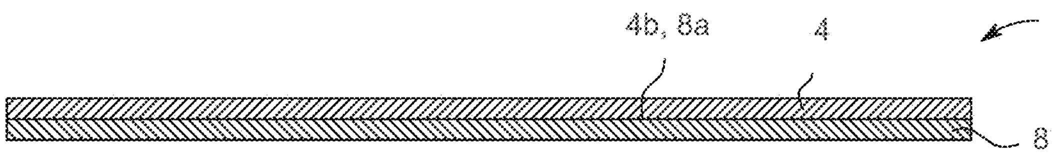
FIG. 2 is a cross-sectional view of a bonded blank assembly of FIG. 1.

With reference to the drawings, FIGS. 1-2 depict various views of a blank assembly 2 used in making one presently preferred and non-limiting embodiment of the cookware of the present invention. After appropriate surface preparation of the various layers of materials to be used in a bonding step, the materials are positioned in an ordered array to create the blank assembly 2 as shown. In some examples, the surface preparation steps may include degreasing, surface abrasion by chemical or mechanical methods, and the like.

The blank assembly 2 has upper and lower layers or plates 4 and 8 which will form the inner and outer surfaces, respectively, of the cookware after the bonding and forming steps. Each of the upper and lower plates 4 and 8 has a top or upper surface (4*a*, 8*a*) and a bottom or lower surface (4*b*, 8*b*). The upper and lower plates 4 and 8 may be discs about 14 inches (355 mm) in diameter to form a near-net size blank for making, for example, a fry pan of 10 inches (254 mm) in diameter. In other examples, the upper and lower plates 4 and 8 may be discs from about 5 inches (127 mm) to about 25 inches (635 mm) in diameter. One of ordinary skill in the art would readily appreciate that the size of the upper and lower plates 4 and 8 can be increased or decreased to make fry pans of larger or smaller sizes, respectively. While FIGS. 1-2 show upper and lower plate 4 and 8 having identical diameters, one of ordinary skill in the art would readily appreciate that a diameter of the upper plate 4 may be larger or smaller than a diameter of the lower plate 8. In some examples, the diameter of the upper plate 4 may be about 5 inches (127 mm) to 25 inches (635 mm). In some examples, the diameter of the lower plate 8 may be about 5 inches (127 mm) to 25 inches (635 mm). The thicknesses of individual plates may be adjusted to achieve desired product weight and thermal performance.

In one exemplary and non-limiting embodiment, one of the upper and lower plates 4 and 8 is formed from stainless steel, while the other of the upper and lower plates 4 and 8 is formed from copper, as discussed herein. For example, the upper plate 4 may be made from stainless steel, while the bottom plate 8 may be made from copper. With reference to FIG. 2, the bottom surface 4*b* of the upper plate 4 is positioned over the top surface 8*a* of the lower plate 8 and the two plates are metalurgically bonded together using a solid state bonding technique to be in intimate, thermally-conductive contact with one another, as described herein.

Figure 3:
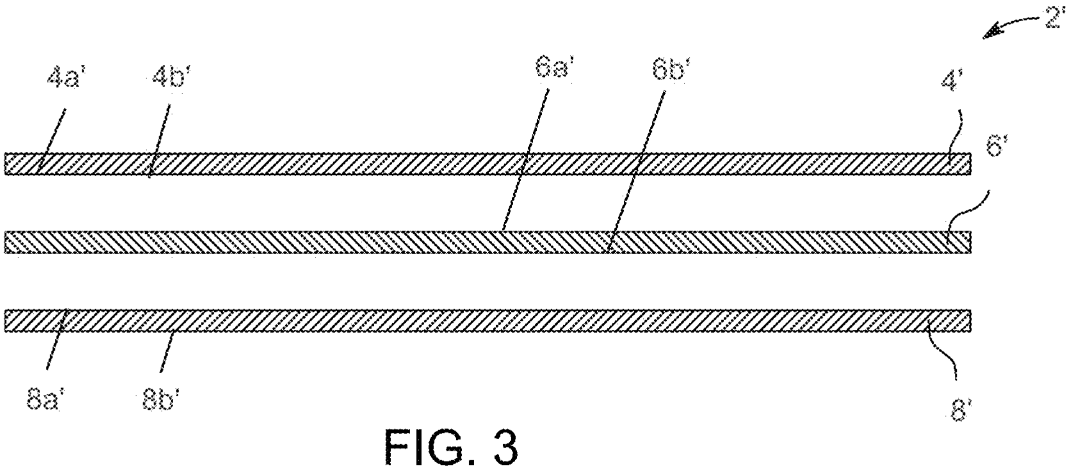
FIG. 3 is an exploded side view of a blank assembly of another embodiment or aspect of the present disclosure.
Figure 4:
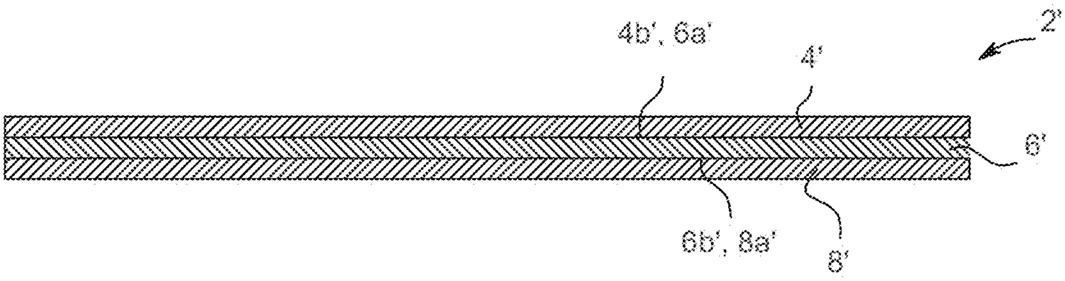
FIG. 4 is a cross-sectional view of a bonded blank assembly of FIG. 3.
Figure 5:
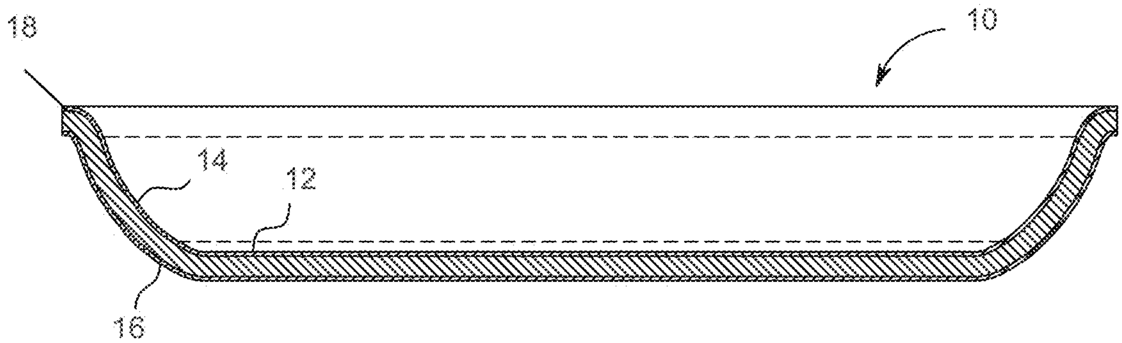
FIG. 5 is a cross-sectional view of a formed fry pan made from the bonded blank assembly of FIG. 4.

With reference to FIGS. 3-5, a blank assembly 2' is shown in accordance with another preferred and non-limiting embodiment. The blank assembly 2' may be used in making cookware. After appropriate surface preparation, the materials constituting the blank assembly 2' are positioned in an ordered array. In some examples, the surface preparation steps may include degreasing, surface abrasion by chemical or mechanical methods, and the like.

The blank assembly 2' has an intermediate plate 6' positioned between an upper plate 4' and a lower plate 8'. The upper and lower plates 4' and 8 form the inner and outer surfaces, respectively, of the cookware after the solid state bonding and forming steps. Each of the upper and lower plates 4' and 8' has a top or upper surface (4*a*', 8*a*') and a bottom or lower surface (4*b*', 8*b*'). Similarly, the intermediate plate 6' has a top or upper surface 6*a*' and a bottom or lower surface 6*b*'. With reference to FIG. 3, the bottom surface 4*b*' of the upper plate 4' is positioned over the top surface 6*a*' of the intermediate plate 6', while the bottom surface 6*b*' of the intermediate plate 6' is positioned over the top surface 8*a*' of the lower plate 8'. The three plates are metalurgically bonded together, such as shown in FIG. 4, using a solid state bonding technique to be in intimate, thermally-conductive contact with one another, as described herein.

The upper plate 4', the intermediate plate 6', and the lower plate 8' may be discs about 14 inches (355 mm) in diameter to form a near-net size blank for making, for example, a fry pan of 10 inches (254 mm) in diameter. In some examples, a diameter of the intermediate plate 6' may be smaller than diameters of the upper and lower plates 4' and 8'. In other examples, the upper plate 4', the intermediate plate 6', and the lower plate 8' may be discs from about 5 inches (127 mm) to about 25 inches (635 mm) in diameter. One of ordinary skill in the art would readily appreciate that the size of the upper plate 4', the intermediate plate 6', and the lower plate 8' can be increased or decreased to make fry pans of larger or smaller sizes, respectively. While FIGS. 3-4 show the upper plate 4', the intermediate plate 6', and the lower plate 8' having identical diameters, one of ordinary skill in the art would readily appreciate that the diameters of upper plate 4', the intermediate plate 6', and the lower plate 8' may be different from one another. In some examples, the thickness of the upper plate 4' may be about 0.010 inches (0.254 mm) to 0.10 inches (2.54 mm), the thickness of the intermediate plate 6' may be about 0.010 inches (0.254 mm) to 0.250 inches (6.35 mm), more preferably about 0.05 inches (1.27 mm) to about 0.150 inches (3.81 mm), and the thickness of the lower plate 8' may be about 0.010 inches (0.254 mm) to 0.100 inches (2.54 mm). The thicknesses of individual plates may be adjusted to achieve desired product weight and thermal performance. The upper and lower plates 4' and 8' may be formed from stainless steel, while the intermediate plate 6' may be formed from copper, and the three plates are metalurgically bonded together using a solid state bonding technique, as described herein. The stainless steel plates may be replaced by titanium in other embodiments. When the lower plate 8' is a ferritic grade of stainless steel intended for use in induction heating, the preferred thickness of the ferritic stainless steel lower plate 8' is about 0.015 inches (0.381 mm) to about 0.025 inches (0.635 mm) so as to improve the heating efficiency by increasing the inductive effect.

While FIGS. 1-4 show preferred and non-limiting examples of blank assemblies 2, 2' made using a stacked arrangement of two plates (FIGS. 1-2) or three plates (FIGS. 3-4), other arrangements comprising a plurality of plates may also be formed. For example, a four or five plate blank assembly may be made by alternately stacking stainless steel and copper plates. After solid state bonding, the four plate blank assembly 40, partially depicted in FIG. 6, has a first stainless steel plate 42 on the top cook surface bonded to a copper plate 44, which is bonded to a second stainless steel plate 46 which, in turn, is bonded to a second copper plate 48 which forms an exterior surface of the formed cookware. When formed, the five plate blank assembly 50, partially shown in FIG. 7, comprises stainless steel plates 52, 52' on top and bottom surfaces with a copper-stainless steel-copper intermediate layer between the top and bottom stainless steel plates 52, 52'.

Figure 6:
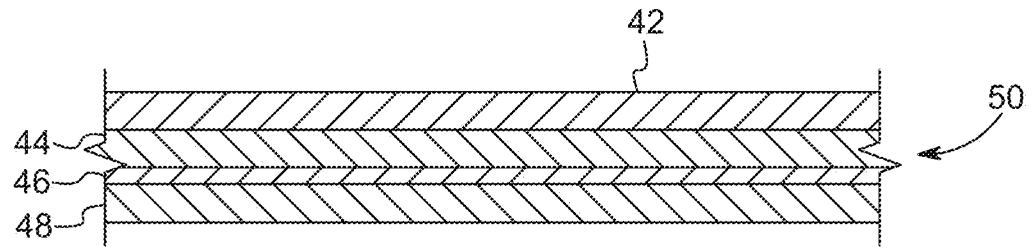
FIG. 6 is an enlarged, partially fragmented, cross-sectional view of a four layer, bonded composite of one embodiment of the present invention.
Figure 7:
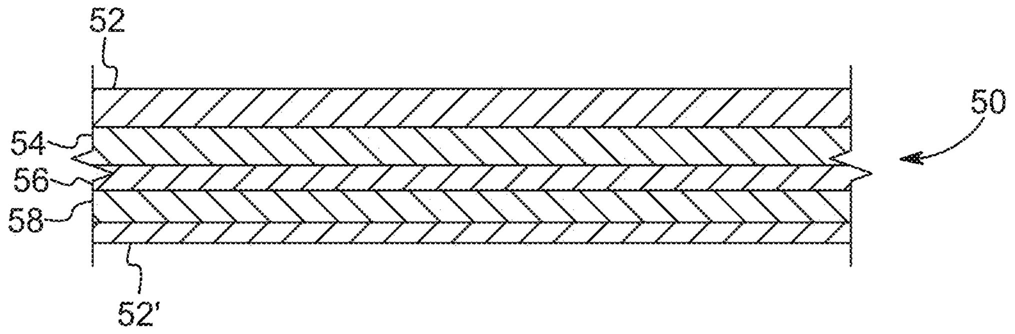
FIG. 7 is a view similar to FIG. 6 but of a five layer bonded composite of another embodiment of the invention.

In the four and five layer embodiments depicted in FIGS. 6 and 7, having internal layers 46 and 56, respectively, of stainless steel, the formed cookware will exhibit a more uniform heat distribution on the cook surface because the internal layers of stainless steel acts as a thermal barrier so as to spread the heat radially. This concept of using a so-called “heat dam” of stainless steel in a core layer of cookware is disclosed in our prior patents, namely, U.S. Pat. Nos. 6,926,971; 7,208,231; 7,906,221; and 8,133,596, which are incorporated by reference herein. These prior patents, however, are based on a roll-bonded method of forming the bonded composite and require a layer of pure aluminum or Alclad aluminum bonded to both sides of the stainless steel layer in order to achieve a metallurgical bond therewith in roll-bonding the various metal layers of the composite. We have discovered that the use of the aluminum or Alclad layers are not necessary when using the solid state bonding technique of the present invention.

The three layer bonded blank assembly 2' of FIG. 4 may be formed in the shape of cookware, such as a frying pan 10 depicted in FIG. 5. The bonded blank assembly 2' may be drawn, such as by using a press, into the shape of the frying pan 10 having a cooking surface 12 and a circumferential sidewall 14 surrounding the cooking surface 12. The sidewall 14 may have a radiused lower edge 16 at a transition with the cooking surface 12. A lip 18 may be formed at an upper end of the sidewall 14 opposite the radiused edge 16. As shown in FIG. 5, the intermediate layer 6', may be bonded with the upper layer 4' and the lower layer 8' over an entire cross-sectional area of the frying pan 10. In some examples, such as when the intermediate layer 6' has a smaller diameter compared to the upper layer 4' and the lower layer 8', the intermediate layer 6' may be bonded with the upper layer 4' and the lower layer 8' in a first portion of the frying pan 10, while the upper and lower layers 4' and 8' may be bonded directly to one another in a second portion of the frying pan 10. For example, the intermediate layer 6' may be provided only in the area of the cooking surface 12 of the frying pan 10, while the upper and lower layers 4' and 8' may be bonded directly to one another in the area of the sidewall 14 of the frying pan 10.

Figure 8:
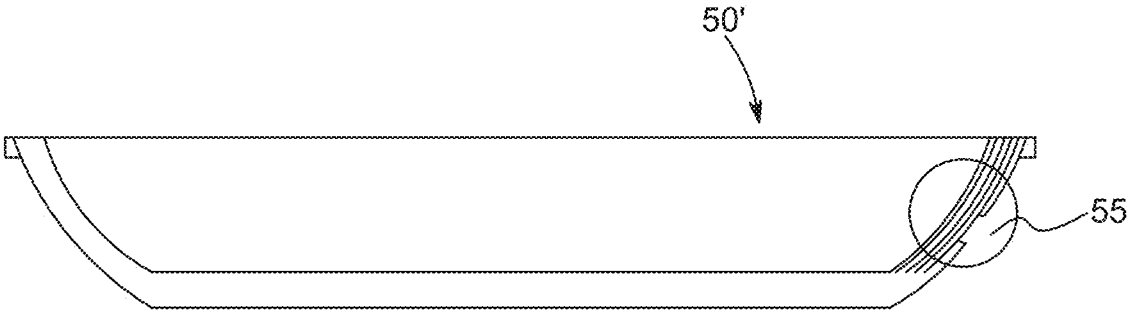
FIG. 8 is a partially fragmented, cross-sectional view of a fry pan made from the five layer bonded composite of FIG. 7 with a skived ring formed around the circumference thereof.
Figure 9:
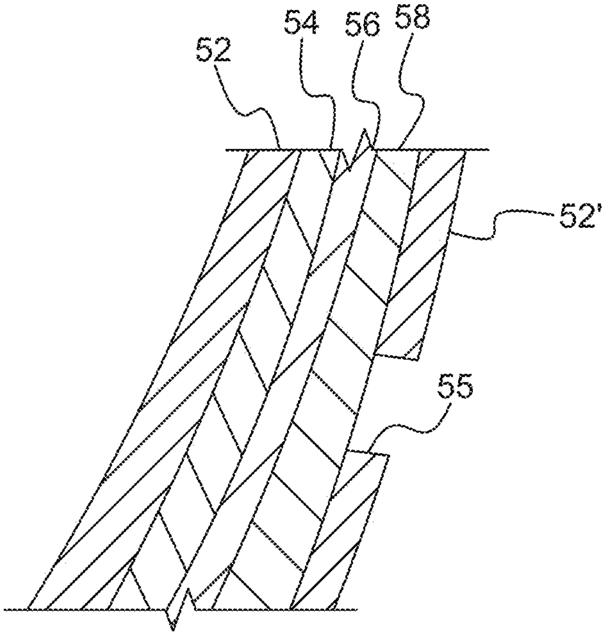
FIG. 9 is an enlarged cross-sectional view of the sidewall and skived groove taken a section circle IX of FIG. 8.

With reference to FIGS. 7-9, a skived ring 55 can be formed around the five-layer cookware 50' by machining away an outer portion of the stainless steel layer 52' to expose the underlying layer of copper 58, to not only provide a pleasing visual copper ring effect but also to provide a quick identification of the type of cookware selected by the user. Such a skived ring may also be formed on the three-layer embodiment of cookware of FIG. 5 (not shown). Other decorative techniques may be employed by selectively removing portions of the outer layer 52' of stainless steel in various patterns, such as by laser cutting, to visually expose the underlying copper layer 58.

Figure 10:
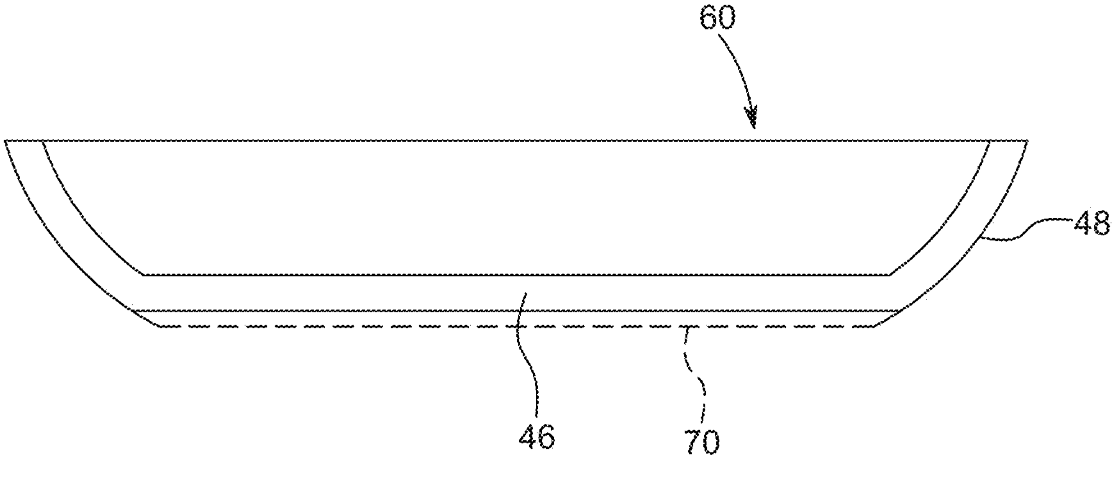
FIG. 10 is a side-elevational view of a fry pan made from the four-layer composite of FIG. 6 according to a still further embodiment of the invention where the bottom, exterior layer of copper is removed to expose the stainless steel bottom layer.

Another embodiment is depicted in FIG. 10 which shows a fry-pan 60 made from the four layer construction of the blank assembly 40 shown in FIG. 6. In this embodiment, the lowermost layer 70 of copper 48 is removed after the forming of the fry pan, as by machining, to expose the lowermost layer 46 of stainless steel. In this embodiment, the exposed surface of the ferritic stainless steel makes the cookware compatible for induction heating at the bottom, while providing a sidewall surface of copper 48.

Having described the structure of the blank assembly in accordance with various embodiments or aspects of the present disclosure, a method of making cookware, such as the frying pan 10, using the blank assembly will now be described. The solid state bonding technique of bonding pre-cut near net shape plate blanks not only reduces scrap losses heretofore encountered in the conventional roll bonding manufacture of composite cookware but also permits the use of other materials in making multiple composites which have proven difficult, impossible and/or expensive to roll-bond. For example, solid state bonding permits the use of different grades of stainless steel than otherwise possible in conventional roll bonding so as to lower costs of materials. The desired result after the bonding is to have a multi-layered disc that has sufficient bond strength to withstand the stress of forming, fine grain structure in the copper to avoid extreme rough texture of the formed part and corrosion resistance which is suitable for a food preparation surface.

Initially, the blank assembly 2 is formed by stacking upper plate 4 and the lower plate 8 such that the lower surface 4*b* of the upper plate 4 is on top of the upper surface 8*a* of the lower plate 8. In the case of the blank assembly 2' shown in FIGS. 3-4, In the case of the blank assembly 2 shown in FIGS. 1-3, the upper plate 4', the intermediate plate 6', and the lower plate 8' are stacked such that the bottom surface 4*b*' of the upper plate 4' is positioned over the top surface 6*a*' of the intermediate plate 6', while the bottom surface 6*b*' of the intermediate plate 6' is positioned over the top surface 8*a*' of the lower plate 8'. Desirably, the plates are aligned such that the centers of each plate share a common axis. In some examples, the plates may be stacked such that their centers are offset from one another. When stacked, the upper plate 4 and the lower plate 8 (FIG. 2), or the upper plate 4', the intermediate plate 6', and the lower plate 8' are substantially parallel to each other. It will be understood that this same or similar stacking technique is employed when making the embodiments of FIGS. 6 and 7.

The blank assembly is then placed in a press apparatus (not shown) for application of a load or pressure in a direction normal (i.e., perpendicular) relative to the planes of plates in the blank assembly. Multiple blank assemblies may be produced in the same press cycle by stacking blank assemblies and placing a high temp separation material between the stacked blank assemblies that are not intended to bond. Pressure is applied evenly across the surface of the plates to expel air from the stacked blank assembly and prevents air encroachment during the bonding cycle. A protective atmosphere different from the surrounding atmosphere may also be introduced around the blank assembly to prevent encroachment of the surrounding atmosphere between the plates of the blank assembly. The protective atmosphere may be a non-oxidizing atmosphere.

Without intending to be bound by theory, it has been found that the protective atmosphere prevents encroachment of ambient air between the plates of the blank assembly during the solid state bonding process, thereby allowing for a reduction in pressure necessary to achieve a strong bond between the plates of the blank assembly. While under a pressure of between about 5,000 psi and 20,000 psi (350 $kg/cm^2$ to 1,400 $kg/cm^2$), heat is applied to the blank assembly or assemblies 2 between about 800° F. and 1,400° F. (427° C. to 760° C.) for a sufficient time (about 1-3 hours) to achieve solid state bonding (i.e., metallurgical bonding) between the plates in the blank assembly or assemblies. In one example, the stacked blank assembly is quickly heated under pressure to a temperature of 1150° F.+/−75° F. (620° C.+/−25° C.), such as using an induction heating device (i.e., at least one induction heating coil) which surrounds the stacked blank assemblies.

Each bonded blank assembly is then removed from the press apparatus and allowed to cool. In some examples, cooling may be accomplished by exposure to ambient air or by using a cooling agent, such as forced air or liquid.

After solid state bonding, the bonded blank assembly is formed in a drawing press or hydroform machine (not shown) into a desired shape, such as a frying pan shape 10 depicted in FIG. 5. A handle or handles (not shown) may be attached to the cookware in a known manner.

In various examples, the blank assembly may have at least one plate made from copper. While copper is typically used in cookware for its high thermal conductivity, various parameters of the solid state bonding process must be controlled to prevent undesirable grain growth in copper. The presence of heat, pressure and holding time all contribute to the quality of the bond between the layers of plates. A temperature higher than 1,250° F. (675° C.) and a holding time longer than 3 hours generally result in a higher bond strength. However, the higher heat and longer hold time result in undesirable grain growth in copper. A metal such as copper has a grain structure that can range from very coarse to very fine and is highly influenced by the chemistry of the metal and the amount of cold work that the metal has undergone. Without intending to be bound by the theory of grain growth, the same process (time, temperature, pressure)

that promotes bond strength, can also promote grain growth in a copper plate. For example, further increasing the temperature to 1,380° F. (750° C.) results in a blank assembly that exhibits extreme texture in the areas of the formed cookware that undergo the most deformation during forming. This texture is difficult or impossible to polish, and also weakens the bonded assembly, thereby making it susceptible to breakage during forming.

In order to control the grain growth in copper due to exposure to temperature higher than 1,250° F. (675° C.), an alloy of copper, such as a copper alloy containing iron, may be used. The addition of iron stabilizes the grain structure of copper at elevated temperature (higher than 1,250° F. (675° C.)). However, the addition of iron greatly decreases the conductivity of the copper alloy compared to high purity copper (35%). For example, high purity copper has thermal a conductivity of 388 W/mK, while alloyed copper having 2% iron has a thermal conductivity of 260 W/mK. For comparison, pure aluminum has a thermal conductivity of 222 W/mK. Copper is typically used in cookware for its high thermal conductivity. Thus, addition of grain-stabilizing iron to high purity copper is undesirable because it reduces its thermal conductivity by 35% to a level that is similar to that of pure aluminum. Even though iron stabilized copper may not be a preferred copper alloy from the standpoint of thermal conductivity, this alloy may still be used.

Adding silver to high purity copper has been found to promote grain stability at elevated temperatures. For example, adding pure silver to high purity, deoxidized copper at a concentration of 0.8 kg/ton (0.0034 wt. % Ag), such as in the C107 copper alloy, sold by Hussey Copper, increases the grain size stability without negatively affecting the thermal conductivity of the resulting alloy compared to unalloyed high purity, deoxidized copper. Grain growth can be further controlled by providing a high purity, deoxidized copper plate in a fully or partially annealed condition, allowing some residual hardness, for example up to ½ hard in copper alloys, such as C101, C102, and C107 oxygen free copper alloys. In some examples, C103, C104, and C105 oxygen free copper alloys may also be used.

Care should be taken in choosing the proper type of C107 copper alloy so as to insure that it does not contain any alloy additions that may be harmful for use in food preparation items such as cookware. For example, it will be noted that at least one brand of C107 copper alloy marketed by Columbia metals, Ltd. (UK) contains 0.35 wt. % arsenic, which may not be suitable for use in food preparation goods.

In addition to a copper plate, the blank assembly 2 or 2' may have at least one plate made from stainless steel. The stainless steel may be made of a ferro-magnetic (ferritic) stainless steel in order to make the finished cookware suitable for use on an induction cooking apparatus. In some examples, titanium or titanium alloys may be substituted for one or more of the stainless steel plates.

The austenitic (nickel bearing) grades of stainless steel have long been the standard of the food preparation industry. These grades, however, are subject to intergranular corrosion after being subject to temperatures between 1,000° F. to 1,650° F. (540° C. to 900° C.). To re-establish corrosion resistance, the material must be heated to a temperature between 1,650° F. to 2,050° F. (900° C. to 1,120° C.) and rapidly quenched to room temperature. However, this temperature is in the grain growth range and near or above the melting temperature of copper. Thus, austenitic grades of stainless steel are impractical for forming a blank assembly 2 or 2' using a solid state bonding technique.

To overcome the intergranular corrosion problems of austenitic stainless steel alloys at bonding temperatures during the solid state bonding process, ferritic stainless steel alloys, such as the 436, 439, 444, and chrome shield 22 alloys, may be used. These ferritic alloys contain elements such as copper, titanium, and niobium that bond with carbon to prevent the formation of chrome carbides. In some examples, the ferritic stainless steel alloy may be low carbon, grain-stabilized, ferritic stainless steel with chrome content of at least 17 wt. %. In the case of a two-sided stainless clad plate, a ferritic grade stainless steel is desirably used on both sides to promote flatness and stability for drawing and making the cookware induction-capable.

Table 1 below summarizes various process parameters and materials used in a solid state bonding process for making a blank assembly suitable for being formed into cookware. Parameters marked with an "X" designate an undesirable process variable or material. Parameters marked with an "O" do not have an effect on process variable or material. Parameters marked with a "✓" designate a desirable process variable or material.

TABLE 1

| Parameter | Bond Strength | Grain Growth | Corrosion Resistance | Conductivity | Shape Stability |
|---|---|---|---|---|---|
| Temp, below 625° C. | X | ✓ | ○ | ○ | ○ |
| Temp. 650° C. (+/−25° C.) | ✓ | ✓ | ○ | ○ | ○ |
| Temp, above 675° C. | ✓ | X | ○ | ○ | ○ |
| Temp, hold longer than 3 h | ✓ | X | ○ | ○ | ○ |
| Temp, hold shorter than 1 h | X | ✓ | ○ | ○ | ○ |
| Temp, hold 1-3 h | ✓ | ✓ | ○ | ○ | ○ |
| Austenitic stainless (one side) | ○ | ○ | X | ○ | X |
| Ferritic stainless (two sides) | ○ | ○ | ✓ | ○ | ✓ |
| Copper-iron alloy | ✓ | ✓ | ○ | X | ○ |
| Copper-silver alloy-fully annealed up to ½ hard | ✓ | ✓ | ○ | ✓ | ○ |

Below are listed some metal combinations that can be made by the technique described above. The thicknesses of individual layers may be adjusted to achieve desired product weight and thermal performance. Repeated layers of like metals need not be of the same thickness.

Stainless/Copper

Stainless/Copper/Stainless

Stainless/Copper/Stainless/Copper

Stainless/Copper/Stainless/Copper/Stainless

Multiple bank assemblies may be produced in the same press cycle by stacking assemblies and placing a high temperature separation material between assemblies that are not intended to bond, as mentioned herein above. The above layer combinations do not limit the number of repetitions in forming the blank assemblies with additional layers of stainless steel and copper as desired.

Copper is used in cookware for its high thermal conductivity. As can be seen above, the conductivity of the iron-copper alloy is only 65% of pure copper and is not much different than the conductivity of pure aluminum. Copper adds weight and expense to cookware. We recommend the use of copper with the highest possible conductivity. The copper alloy we have arrived at for cookware products is high purity, deoxidized copper that has a small addition of pure silver at a concentration of 0.8 kg/metric ton. The silver addition gives an increase in grain size stability to a higher (+122° F.; +50° C.) temperature than copper alloy without silver. The silver has no negative effect on the conductivity of the copper alloy. The copper alloy is known in the industry as C107. It is a deoxidized grade and is the material recommended as part of this disclosure. While C107 copper alloy performs very well, we have found generally that high purity, oxygen free copper alloys having some residual hardness or temper from fully annealed up to ½ hard have exhibited controlled grain growth properties during solid state bonding at elevated temperatures, including C107, C101, and C102 oxygen-free copper alloys.

In various examples, the present invention may be further characterized by one or more of the following clauses:

Clause 1. Cookware having a multi-layer, solid state bonded composite wall structure, the cookware comprising:
- at least one stainless steel layer; and
- at least one copper layer metallurgically bonded to the at least one stainless steel layer via solid state bonding, and
- wherein the at least one copper layer is a grain stabilized copper.

Clause 2. The cookware of clause 1, wherein the at least one stainless steel layer is made from a 300 series stainless steel or a 400 series stainless steel.

Clause 3. The cookware of clause 1 or clause 2, wherein the at least one stainless steel layer is made from a 436 stainless steel alloy, a 439 stainless steel alloy, or a 444 stainless steel alloy.

Clause 4. The cookware of any of clauses 1-3, wherein the at least one stainless steel layer is made from a ferromagnetic stainless steel with chrome content of at least 17%.

Clause 5. The cookware of any of clauses 1-4, wherein the grain stabilized copper is one selected from a C101 copper alloy, a C102 copper alloy, and a C107 copper alloy.

Clause 6. The cookware of any of clauses 1-5, wherein the at least one stainless steel layer has a thickness between about 0.01 inches (0.254 mm) to about 0.10 inches (2.54 mm).

Clause 7. The cookware of any of clauses 1-6, wherein the at least one copper layer has a thickness between about 0.01 inches (0.254 mm) to about 0.25 inches (6.35 mm).

Clause 8. The cookware of any of clauses 1-7, wherein the at least one stainless steel layer is circular with a diameter between about 5 inches (127 mm) to about 25 inches (635 mm).

Clause 9. The cookware of any of clauses 1-8, wherein the at least one copper layer is circular with a diameter between about 5 inches (127 mm) to about 25 inches (635 mm).

Clause 10. The cookware of any of clauses 1-9, wherein the at least one stainless steel layer and the at least one copper layer are circular, and wherein a diameter of the at least one stainless steel layer is equal to or larger than a diameter of the at least one copper layer.

Clause 11. The cookware of any of clauses 1-10, wherein the at least one stainless steel layer and the at least one copper layer are circular, and wherein a center of the at least one stainless steel layer is on a common axis with a center of the at least one copper layer.

Clause 12. The cookware of any of clauses 1-11, wherein the cookware is formed as a frying pan.

Clause 13. Cookware having a three-layer, bonded composite wall structure, the cookware comprising: an upper stainless steel layer and a lower stainless steel layer; and a copper layer between the upper stainless steel layer and the lower stainless steel layer, the copper layer metallurgically bonded directly to the upper stainless steel layer and the lower stainless steel layer.

Clause 14. The cookware of clause 13, wherein a portion of the lower stainless steel layer is removed, such as by a skived ring or a laser inscribed pattern, to visually expose an underlying surface of the copper layer.

Clause 15. The cookware of clause 13 or clause 14, wherein the upper stainless steel layer and the lower stainless steel layer are made from a ferritic stainless steel, and wherein the copper layer is made from a grain stabilized copper.

Clause 15a. The cookware of clauses 15, wherein the grain stabilized copper is one selected from a C101 copper alloy, a C102 copper alloy, and a C107 copper alloy.

Clause 16. Cookware having a four-layer, bonded composite wall structure, the cookware comprising:
- a first layer of stainless steel defining a cook surface of the cookware;
- a first layer of copper directly bonded to the first layer of stainless steel;
- a second layer of stainless steel directly bonded to the first layer of copper;
- a second layer of copper directly bonded to the second layer of stainless steel, said second layer of copper defining an exterior surface of the cookware.

Clause 17. The cookware of clause 16, wherein a lowermost surface of the second layer of copper is removed to expose an underlying surface of the second layer of stainless steel, whereby the cookware is compatible with induction heating, while an outer sidewall of the cookware is defined by the second layer of copper.

Clause 18. The cookware of clause 16 or clause 17, wherein the upper stainless steel layer and the lower stainless steel layer are made from a ferritic stainless steel, and wherein the copper layer is made from a grain stabilized copper.

Clause 18a. The cookware of clause 18, wherein the grain stabilized copper is one selected from a C101 copper alloy, a C102 copper alloy, and a C107 copper alloy.

Clause 19. Cookware having a five-layer bonded composite wall structure, the cookware comprising:
- a first layer of stainless steel defining a cook surface of the cookware;
- a first layer of copper directly bonded to the first layer of stainless steel;
- a second layer of stainless steel directly bonded to the first layer of copper;
- a second layer of copper directly bonded to the second layer of stainless steel;
- a third layer of stainless steel directly bonded to the second layer of copper, defining an exterior surface of the cookware.

Clause 20. The cookware of clause 19, wherein a portion of the third layer of stainless steel is removed to visually expose an underlying surface of the second layer of copper.

Clause 21. The cookware of clause 20, wherein the visually exposed portion is one of a skived ring or a laser inscribed pattern.

Clause 22. The cookware of any of clauses 19-21, wherein the first, second, and third layers of stainless steel are made from a ferritic stainless steel and wherein the first and second layers of copper are made from a grain stabilized copper.

Clause 23. The cookware of clause 22, wherein the grain stabilized copper is one selected from a C101 copper alloy, a C102 copper alloy, and a C107 copper alloy.

Clause 24. A method of making multi-layer, bonded cookware, the method comprising:

providing at least one stainless steel layer and at least one copper layer in a stacked blank assembly; and applying heat and pressure to the stacked blank assembly for a predetermined period of time such that at least one stainless steel layer is metallurgically bonded to the at least one copper layer via solid state bonding, wherein the at least one stainless steel layer is a ferritic stainless steel layer, and wherein the at least one copper layer is a grain stabilized copper.

Clause 25. The method of clause 24, wherein heat is applied at a temperature below a grain growth temperature of the at least one copper layer.

Clause 26. The method of clause 24 or clause 25, wherein heat is applied at a temperature between about 1150° F. (625° C.) to about 1250° F. (675° C.).

Clause 27. The method of any of clauses 24-26, wherein pressure is applied at about 5,000 psi (350 kg/cm$^2$) to about 20,000 psi (1,400 kg/cm$^2$).

Clause 28. The method of any of clauses 24-27, wherein pressure is applied in a direction normal to a plane of the at least one stainless steel plate and the at least one copper plate.

Clause 29. The method of any of clauses 24-28, wherein the predetermined period of time is about 1 hour to about 3 hours.

Clause 30. The method of any of clauses 24-29, wherein the step of applying heat and pressure is carried out by an induction heating coil surrounding the blank assembly and wherein a non-oxidizing atmosphere is present between the induction heating coil and the blank assembly.

Clause 31. The method of any of clauses 24-30, further comprising forming the bonded blank assembly into a frying pan shape using a drawing press or a hydroform machine.

The present invention has been described with reference to specific details of particular examples thereof. It is not intended that such details be regarded as limitations upon the scope of the invention except insofar as and to the extent that they are included in the accompanying claims.

The invention claimed is:

1. Cookware having a multi-layer, solid state bonded composite wall structure, the cookware comprising:

at least one stainless steel layer; and at least one copper layer metallurgically bonded to the at least one stainless steel layer via solid state bonding at a temperature between 625° C. and 675° C. (1157° F. and 1250° F.) and a static pressure between 5,000 psi and 20,000 psi (350 kg/cm$^2$ to 1,400 kg/cm$^2$), wherein the at least one copper layer is any high purity, deoxidized copper or copper alloy having some residual hardness or temper from fully annealed up to ½ hard that exhibits controlled grain growth properties during solid state bonding, wherein the at least one stainless steel layer is made from a ferro-magnetic stainless steel.

2. The cookware of claim 1, wherein the at least one stainless steel layer is made from a 400 series stainless steel.

3. The cookware of claim 1, wherein the at least one stainless steel layer is made from a 436 stainless steel alloy, a 439 stainless steel alloy, or a 444 stainless steel alloy.

4. The cookware of claim 1, wherein the at least one stainless steel layer has chrome content of at least 17%, or wherein the at least one stainless steel layer is made from a low carbon, grain-stabilized, ferritic stainless steel alloy having chrome content of at least 17 wt %.

5. The cookware of claim 1, wherein the at least one stainless steel layer has a thickness between about 0.01 inches (0.254 mm) to about 0.10 inches (2.54 mm).

6. The cookware of claim 1, wherein the at least one copper layer has a thickness between about 0.01 inches (0.254 mm) to about 0.25 inches (6.35 mm).

7. The cookware of claim 1, wherein the at least one stainless steel layer is circular with a diameter between about 5 inches (127 mm) to about 25 inches (635 mm).

8. The cookware of claim 1, wherein the at least one copper layer is circular with a diameter between about 5 inches (127 mm) to about 25 inches (635 mm).

9. The cookware of claim 1, wherein the at least one stainless steel layer and the at least one copper layer are circular, and wherein a diameter of the at least one stainless steel layer is equal to or larger than a diameter of the at least one copper layer.

10. The cookware of claim 1, wherein the at least one stainless steel layer and the at least one copper layer are circular, and wherein a center of the at least one stainless steel layer is on a common axis with a center of the at least one copper layer.

11. The cookware of claim 1, wherein the cookware is formed as a frying pan.

12. The cookware of claim 1, wherein the at least one copper layer is a C107 copper alloy comprising silver.

13. The cookware of claim 1, wherein the at least one copper layer is a C101 copper alloy layer.

14. The cookware of claim 1, wherein the at least one copper layer is a C102 copper alloy layer.

15. The cookware of claim 1, wherein the ferro-magnetic stainless steel is a ferro-magnetic stainless steel alloy containing elements that bond with carbon to prevent the formation of chrome carbides.

16. Cookware having a three-layer, bonded composite wall structure, the cookware comprising:

an upper stainless steel layer and a lower stainless steel layer; and a copper layer between the upper stainless steel layer and the lower stainless steel layer, the copper layer metallurgically bonded directly to the upper stainless steel layer and the lower stainless steel layer, wherein the upper stainless steel layer and the lower stainless steel layer are made from a ferritic stainless steel, and wherein the copper layer is made from any high purity, deoxidized copper or copper alloy having some residual hardness or temper from fully annealed up to ½ hard that exhibits controlled grain growth properties during solid state bonding, and wherein a ring-shaped portion of the lower stainless steel layer is removed to visually expose a portion of the copper layer.

17. The cookware of claim 16, wherein the visually exposed portion is one of a skived ring or a laser inscribed pattern.

18. The cookware of claim 16, wherein the copper layer is a C107 copper alloy comprising silver.

19. The cookware of claim 16, wherein the copper layer is a C101 copper alloy.

20. The cookware of claim 16, wherein the copper layer is a C102 copper alloy.

* * * * *